Sept. 13, 1960 — A. C. GROHSGAL — 2,952,829
ELECTRICAL WIRING DEVICES
Filed March 15, 1957 — 4 Sheets-Sheet 1
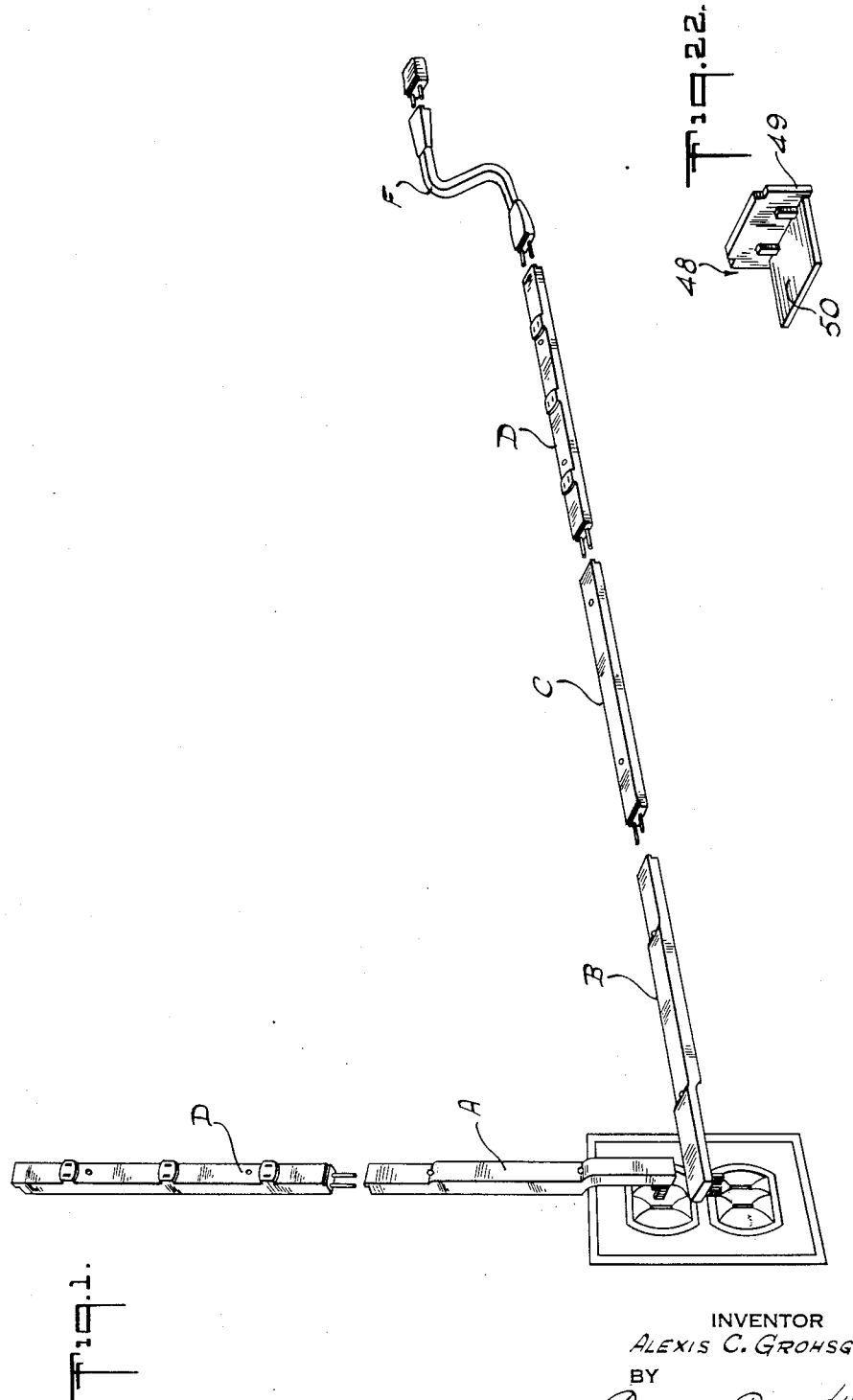
INVENTOR
ALEXIS C. GROHSGAL
BY
Burgess, Ryan, & Hicks
ATTORNEYS

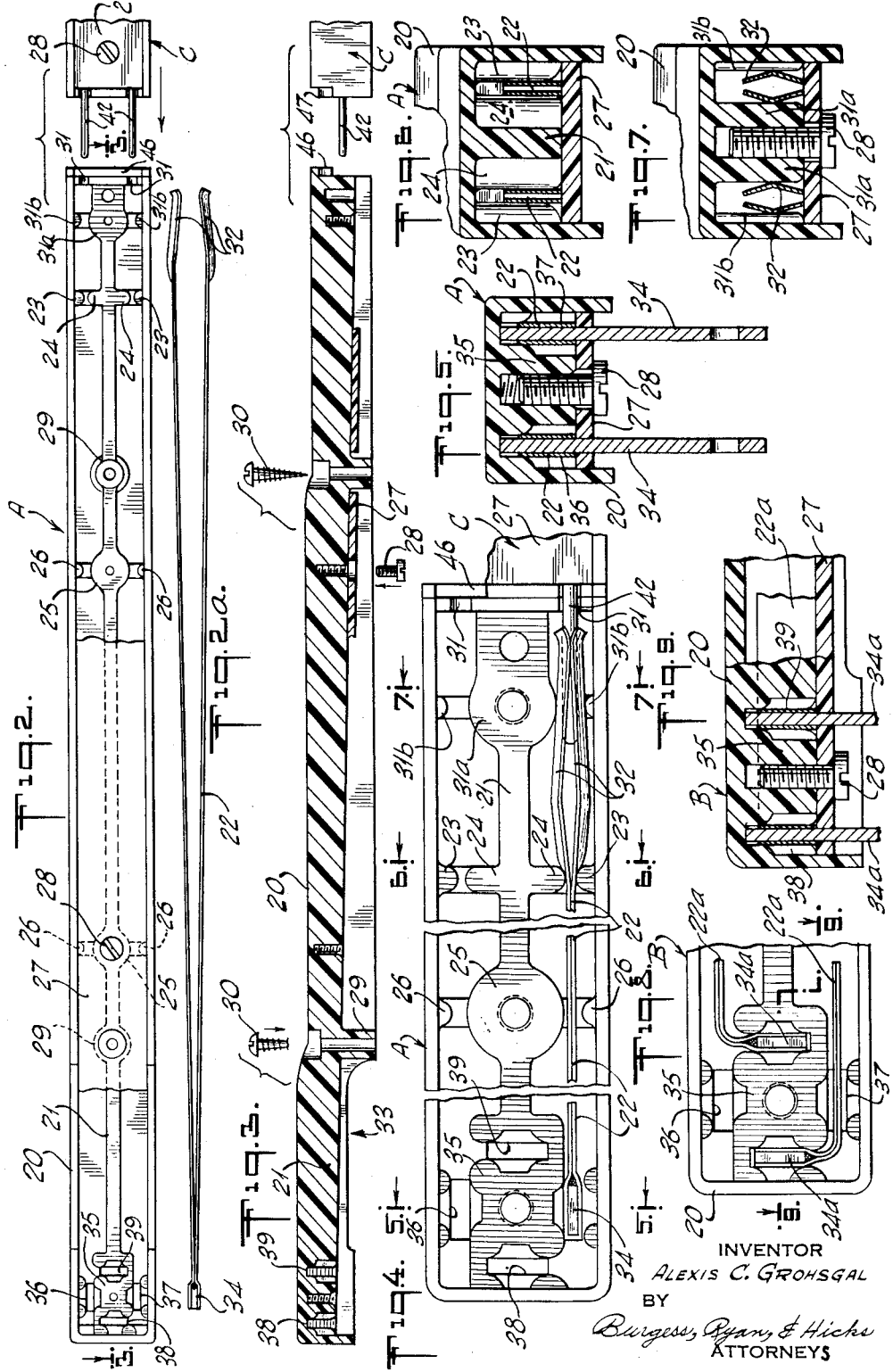

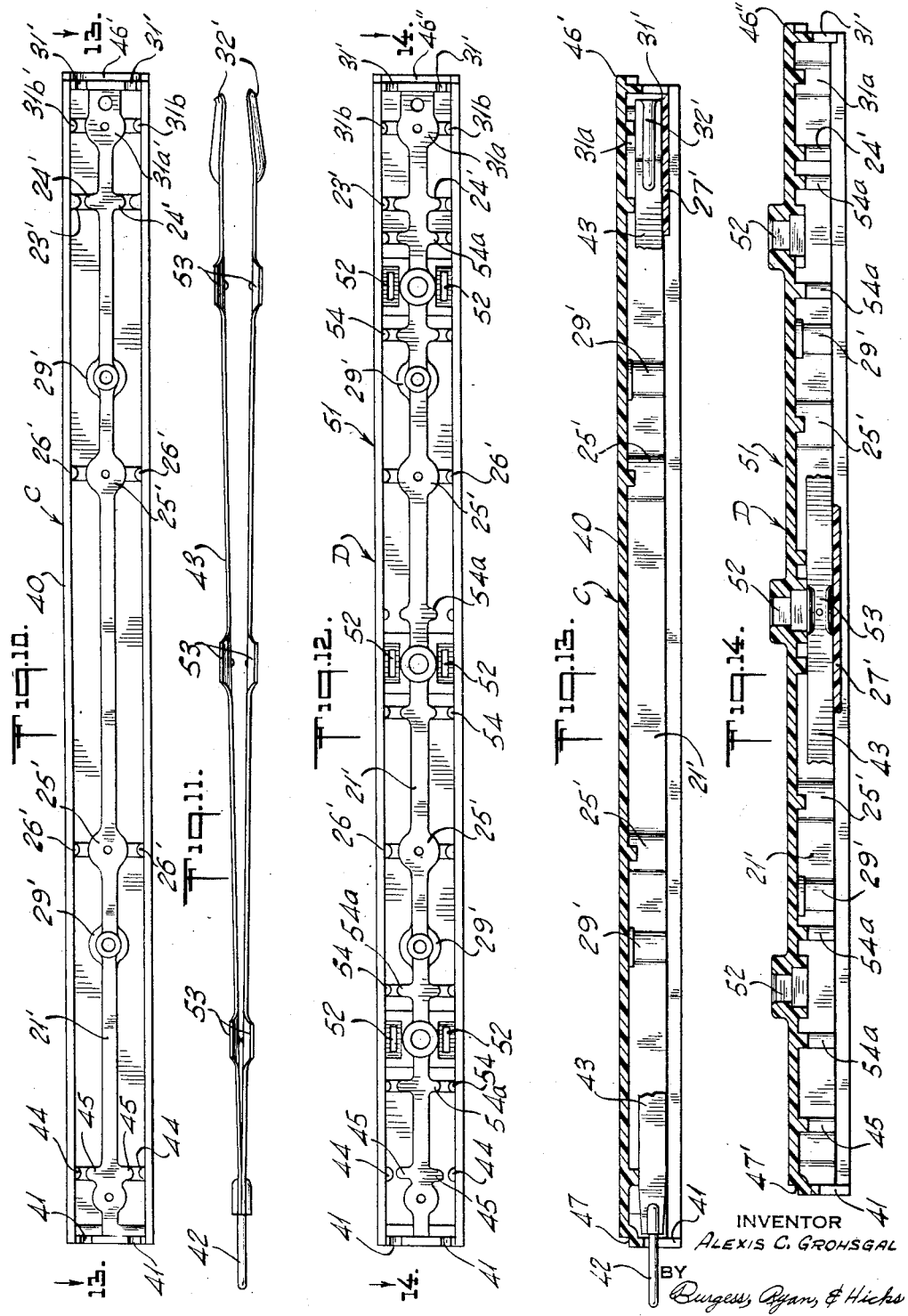

Sept. 13, 1960  A. C. GROHSGAL  2,952,829
ELECTRICAL WIRING DEVICES
Filed March 15, 1957  4 Sheets-Sheet 4
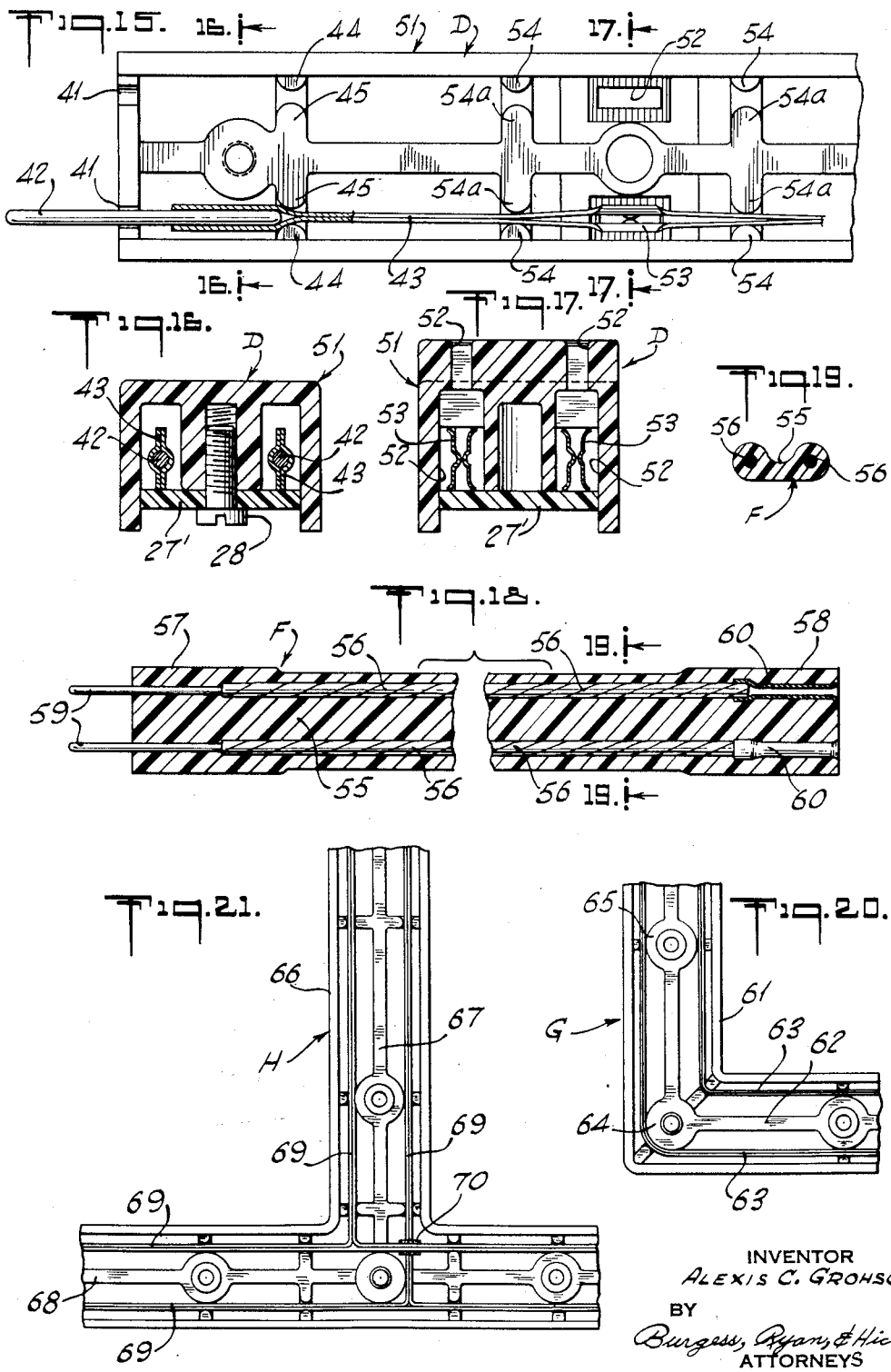
INVENTOR
ALEXIS C. GROHSGAL
BY
Burgess, Ryan, & Hicks
ATTORNEYS United States Patent Office 2,952,829
Patented Sept. 13, 1960

2,952,829

ELECTRICAL WIRING DEVICES

Alexis C. Grohsgal, Cranston, R.I., assignor to Cable Electric Products, Inc., Providence, R.I., a corporation of Delaware Filed Mar. 15, 1957, Ser. No. 646,255

6 Claims. (Cl. 339—22)

The present invention relates to electrical wiring devices and relates more particularly, to a series of interconnectable electrical wiring devices for extending existing electrical facilities to a desired location.

An object of the present invention is to provide a series of interconnectable electrical wiring devices which may be readily assembled in various combinations of appropriate configuration to extend existing electrical facilities to a desired location. Another object of the invention is to provide a series of interconnectable electrical wiring devices for extending existing electrical facilities to a desired location which can be installed safely and without difficulty by the average person. A further object of the invention is to provide a series of interconnectable electrical wiring devices for extending existing electrical facilities to a desired location which will have adequate capacity to carry an electrical load suitable for the wiring circuits to which it is connected and which are constructed so that they cannot be readily damaged when installed on a permanent basis.

Other objects and advantages of the present invention will be apparent and better understood from the following description and the accompanying drawings in which:

Fig. 1 is a perspective view illustrating combinations of interconnectable electrical wiring devices embodying the present invention;

Fig. 2 is a bottom view of a housing for one of the interconnectable electrical wiring devices shown in Fig. 1 and one end of an adjoining device;

Fig. 2a is a bottom view of a bus bar for the housing shown in Fig. 2;

Fig. 3 is a section view taken along the line 3—3 of Fig. 2;

Fig. 4 is a bottom view on an enlarged scale of portions of the housing shown in Fig. 2 with the bus bar shown in Fig. 2a assembled therewith;

Fig. 5 is a vertical section view of the assembled device taken along the line 5—5 of Fig. 4;

Fig. 6 is a vertical section view of the assembled device taken along the line 6—6 of Fig. 4;

Fig. 7 is a vertical section view of the assembled device taken along the line 7—7 of Fig. 4;

Fig. 8 is a bottom view of one end of the housing shown in Fig. 2 assembled with a modified form of bus bar;

Fig. 9 is a vertical section view taken along the line 9—9 of Fig. 8;

Fig. 10 is a bottom view of a housing for another of the wiring devices shown in Fig. 1;

Fig. 11 is a bottom view of a bus bar for use in the housing shown in Fig. 10;

Fig. 12 is a bottom view of a housing for another of the wiring devices shown in Fig. 1;

Fig. 13 is a section view of an assembled device taken along the line 13—13 of Fig. 10;

Fig. 14 is a section view of an assembled device taken along the line 14—14 of Fig. 12;

Fig. 15 is a bottom view on an enlarged scale of a portion of the wiring device shown in Fig. 14 with certain parts omitted for clarity;

Fig. 16 is a section view taken along the line 16—16 of Fig. 15;

Fig. 17 is a section view taken along the line 17—17 of Fig. 15;

Fig. 18 is a plan view in horizontal section of a flexible connecting link shown in Fig. 1;

Fig. 19 is a section view taken along the line 19—19 of Fig. 18;

Fig. 20 is a fragmentary bottom view of a modified form of electrical wiring device embodying the invention;

Fig. 21 is a fragmentary bottom view of another modified form of electrical wiring device embodying the invention; and Fig. 22 is a perspective view of an end closure cap for use with wiring devices embodying the invention.

Referring to the drawings in detail, the present invention contemplates the provisions of a series of wiring devices which may be interconnected electrically with each other to form various combinations of suitable lengths and configurations to extend existing electrical facilities to practically any desired location. Hence, it will be understood that the particular combinations of electrical wiring devices embodying the invention shown in Fig. 1 are merely illustrative and that a series of electrical wiring devices embodying the invention may be assembled as desired.

A combination of wiring devices embodying the invention is connected to an existing electrical circuit by merely plugging one of the devices into the customary electrical outlet. This can be done by anyone and since no wired connections are required, there is no necessity for the services of a trained electrician.

In general, wiring devices embodying the invention may be referred to as connecting links or strips and each combination will include a contact strip or cap A or B. As shown in Fig. 1, the contact strip A extends vertically from the outlet while the contact strip B extends horizontally from the outlet. As will be explained hereinafter, each of the contact strips has a pair of contact prongs extending from the bottom thereof which are spaced to fit into the openings in the electrical outlet.

For example, as shown in Fig. 1, one end of an extension strip C may be connected to the end of the contact strip B and one end of an outlet strip D may be connected to the other end of the extension strip. Similarly, one end of an outlet strip D may be connected to the end of the vertical contact strip A. Each of the connecting links includes a rigid housing of insulating material which is attached permanently or semi-permanently to a wall or other supporting surface by means of screws or the like. A flexible connecting strip E may also be provided which can be bent to conform to changes in the plane of the supporting surface.

As shown in Figs. 2–7, the contact strips A and B each include an elongated rigid housing 20 molded from a suitable insulating material. The housing is hollow and has a centrally located partition 21 extending lengthwise on the inside thereof which divides the interior of the housing into two separate chambers, each of which contains an electrical conductor or bus bar 22.

The bus bars 22 extend lengthwise of the housing in the chambers and opposing bosses 23 and 24 extending inwardly from the sides of the housing and the partition, respectively, hold the bus bars in spaced relation thereto. Enlarged bosses 25 formed at spaced intervals on the central partition and with opposing bosses 26 on the sides of the housing also hold the bus bars in place and a cover 27 of insulating material which rests on the enlarged bosses and is secured thereto by screws 28 or other suitable fastening means closes the bottom of the housing.

The cover which extends for the length of the housing also serves to hold the bus bars in their respective chambers in the housing.

In addition, there are bosses 29 which extend to the bottom of the housing formed at spaced intervals along the central partition and the cover has openings through which such bosses extend. These bosses contain openings which extend therethrough and fastening screws 30 may be inserted therein from the top of the housing to secure the strip to a wall or other supporting surface.

The vertical wall at one end of the housing has spaced openings 31 therein which communicate with terminal or contact receiving portions 32 formed on the bus bars. The terminal portions of the bus bars are located inside of the respective chambers in the housing in alignment with the openings in the end thereof. The sides of the housing and the end wall at the other end of the housing are of reduced height, as indicated at 33, to permit this end of the housing to extend over a raised wall plate on the electrical outlet with the bottom of the rest of the strip resting upon the wall or other supporting surface.

As shown in Fig. 2a, the bus bars 22 may be formed from two flat strips of electrically conductive metal. One end of each strip is shaped to form the contact receiving portions 32 which will grip a contact prong inserted between the strips with a spring action and make good electrical contact therewith. The contact receiving portions of the bus bars are held in alignment with the openings in the end of the housing and are prevented from being spread apart by a boss 31a on the central partition and bosses 31b on the sides of the housing which are located on opposite sides of the contact receiving portions of the bus bars.

Contact prongs 34 which are secured to the other ends of the bus bars by soldering or riveting, extend at right angles to the length of the bus bars and project beyond the bottom of the housing when the bus bars are assembled therein. The contact prongs are held in spaced relation to each other by a spacing boss 35 which is formed on the inside of the housing at one end of the central partition. The spacing boss in conjunction with the sides of the housing forms recesses 36 and 37 into which the ends of the contact prongs and the bus bars fit. The spacing of the contact prongs correspond to the spacing between the contact receiving openings in the outlet and the contact prongs project beyond the bottom of the housing for a distance sufficient to enter into engagement with the electrical contact members in the outlet in the usual manner. It will be noted that the cover is also supported on and secured to the spacing bosses 31a and 35 at the ends of the central partition.

Recesses 38 and 39 which are positioned at right angles to the length of the housing are also formed on the other sides of the spacing boss for the contact prongs. In the contact strip B, as shown in Fig. 8, the ends of bus bars 22a to which contact prongs 34a are attached, are bent at right angles to the length of the bus bars and the ends of these contact prongs and the bus bars are seated in the recesses 38 and 39 so that the contact prongs are rotated by 90° with respect to the housing. With this arrangement, the contact strip will extend from the outlet in a vertical direction as shown in Fig. 1. Of course, this will depend on the way in which the outlet is installed. The remainder of the contact strip B is similar to the contact strip previously described.

The extension strip C comprises a housing 40 which is generally similar to the housings for the contact strips A and B. However, the sides of the housing are of uniform height with the bottom edges thereof resting flush against the supporting surface on which the housing is installed. In addition, an end wall of the housing has spaced openings 41 therein through which contact prongs 42 extend for engagement with the contact receiving portions of the bus bars in the preceding strip.

The contact prongs 42 which are spaced to enter into the openings in the opposing end wall of a preceding strip, project beyond the end of the housing a sufficient distance to engage with the contact receiving portions of the bus bars located inside of the preceding strip when the ends of the two strips are brought into abutting relation. The contact prongs are attached to and form extensions of bus bars 43 which extend lengthwise of the housing in separate chambers formed by a central partition 21'. As in the previous strips, the bus bars may be formed from strips of electrically conductive material with contact receiving portions 32' formed at the other ends thereof. The contact receiving portions of the bus bars are located inside of the housing in alignment with openings 31' in the other end wall of the housing.

The housing for the extension strip also has bosses 29' which extend from the top to the bottom of the housing and rest on the supporting surface. These bosses have openings extending therethrough to receive screws or other suitable means for fastening the strip on the supporting surface and the housing also has bosses 25' formed along the central partition to which a cover 27' may be attached. The bosses 25' in conjunction with lugs 26' extending inwardly from the sides of the housing in opposing relation thereto hold the bus bars in spaced relation to the central partition and the sides of the housing.

At the contact receiving end of the housing, opposing lugs 23' and 24' together with lugs 31b' and a boss 31a' on the sides of the housing and the central partition, respectively, engage with and hold the contact receiving portions of bus bars in position. At the other end of the housing, opposing lugs 44 and 45 on the side walls of the housing and the central partition hold the ends of the bus bars to which the contact prongs are attached in position.

The ends of the housings which are in abutting relation have overlapping portions which align the tops of the adjoining strips. This insures a smooth top surface for a series of interconnected strips and the first strip also aids in holding the next strip in place. The overlapping portions are in the form of an overhanging lip or flange 46 located at the top of the contact receiving end of the housing for the contact strip and a corresponding recess or groove 47 located at the top of the contact prong end of the housing for the extension strip. When the units are assembled, the flange fits into the recess in the end of the succeeding housing.

Similarly, there is an overhanging lip or flange 46' at the other end of the extension strip housing which fits into a groove or recess in the abutting end of the housing for the succeeding strip. For example, the housing 48 for the convenience outlet strip D has recess 47' at one end into which the flange on the preceding housing fits and there is an overhanging lip 46" at the other end thereof.

If desired, the contact receiving openings in the end of the last housing in a series of strips may be closed by an end cap 48, shown in Fig. 22. The end cap is formed from insulating material and has an upright or vertical wall 49 which fits under the overhanging lip and lies flush against the end of the last housing. A thin horizontal plate or foot 50 extends at right angles to the vertical wall and is held in place under the end of the last housing.

The housing 51 for the outlet strip D, as shown best in Figs. 12 and 14, has three pairs of spaced openings 52 in the top surface thereof located at intervals along its length. The openings 52 of each pair are spaced to receive the contact blades of the usual attachment plug. Each opening extends through the top of the housing and communicates with one of the separate chambers therein containing one of the bus bars.

The bus bar 43, shown in Fig. 11, which is formed from two strips of electrically conductive material, has openings 53 formed therein at intervals to receive a contact blade of an attachment plug between the strips at these points. The contact receiving openings are located at intervals corresponding to the intervals for the openings in the top of the housing. The openings in the bus bars may be formed by bending the strips away from each other in such a way that a contact blade inserted between the strips will be gripped by the strips to make electrical contact therewith.

As mentioned above, one of the contact receiving openings in the bus bars is located beneath each of the openings in the top of the housing and opposing bosses 54 and 54a on the side walls of the housing and central partition, respectively, engage with the bus bars at opposite ends of the contact receiving openings and hold the strips forming the bus bars together so that a good electrical connection will be made when a contact blade is inserted between them.

In other respects, the housing for the outlet strip is similar to the housing for the extension strip and hence, the description thereof need not be repeated. It will be noted that the bus bar described above is suitable for use in either the outlet strip or the extension strip. However, in the latter case, the contact receiving openings formed in the bus bars may be eliminated if desired.

The housings for the strips described above are rigid and thus, can only be installed on a flat or plane surface. For installations where the plane of the supporting surface changes, a flexible link F is provided which can be bent to accommodate a change in the direction of the supporting surface such as a corner. The flexible link is in the form of a flat body 55 of flexible insulating material such as rubber or the like, in which spaced flexible conductors 56 are embedded. End pieces 57 and 58 are formed at the ends of the flat body and are shaped to mate with the ends of the rigid housings.

Spaced contact prongs 59 which are connected to the conductors in the flat strip, extend from one of the end pieces for engagement with the bus bars in the preceding strip. Spaced contact receiving members 60 which are also connected to the conductors in the flat strip, are molded in the other end piece to connect with the contact prongs from the next strip.

The strips described above will extend in a straight line, either vertically or horizontally, from the outlet to which they are connected. However, strips of different configurations may be provided for use where the direction in which the strips extend is to be changed. For example, a strip G forming a right angle, as shown in Fig. 20, or a strip H having a T-shape, as shown in Fig. 21, may be provided.

As shown in Fig. 20, the right angle strip comprises a rigid housing 61 of insulating material which has two arms extending at right angles to each other. As in the strips previously described, the housing is hollow and a central partition 62 which forms two separate chambers on the interior of the housing and a suitable shaped bus bar 63 is located in each of the chambers. In addition, there are bosses 64 which extend to the bottom of the strip and rest on the supporting surface to which the strip is to be attached. The bosses have openings extending therethrough to receive attaching screws or the like. There are also bosses 65 to which a bottom cover (not shown) is attached.

As shown in Fig. 21, the T-shaped strip H comprises a rigid housing 66 of insulating material and is hollow. A central partition 67 divides the leg of the T into two separate chambers and a central partition 68 divides the top of the T into two separate chambers. A bus bar 69 is located in each of the chambers 69 with one of the bus bars in the leg of the T being connected to one end of the bus bars in the top of the T and the other bus bar in the leg of the T being connected to the other bus bar in the top of the T. To make these connections, it is necessary for one of the bus bars in the leg of the T to cross one of the bus bars in the top of the T and an insulating spacer 70 is inserted between these bus bars at the point where they cross. Contact prongs will be provided which will extend from the leg of the T and each end of the top of the T will have contact receiving openings therein.

Each installation of wiring devices embodying the invention will include a contact cap or strip which has contact prongs at one end to engage with the contacts in an electrical receptacle. In installing a selected combination of the wiring devices, the contact prongs on the contact strip are merely plugged into the receptacle in the usual manner and the strip is then affixed to the supporting surface by screws or the like. The contact prongs projecting from one end of the next strip are then inserted in the openings in the other end of the first strip and the second strip is secured to the supporting surface in the same manner. This procedure is repeated for the remaining strips of the combination and an end cap may be placed over the end of the last strip.

The strips may be of any desired length, but it has been found convenient to make them approximately twelve inches long. The strips are approximately five-eighths of an inch in height and are slightly less than an inch in width so that they will have a neat and inconspicuous appearance when installed.

It will be understood that various changes and modifications may be made in the embodiments of the invention illustrated and described herein without departing from the spirit or scope of the invention as defined by the following claims.

I claim:

1. An electrical wiring device of the character described, which comprises an elongated hollow housing molded from insulating material, said housing having an opening in its bottom and having end walls and side walls, a central partition extending lengthwise of the housing and dividing the interior thereof into two separate chambers, at least one of the end walls of the housing having spaced openings therein communicating with the separate chambers in the housing, a bus bar extending lengthwise of the housing in each of said chambers, each of said bus bars being formed by a pair of opposed flat strips of electrically conductive material, each pair of strips having ends aligned with one of the openings in the end wall of the housing, opposing bosses formed on the side walls and the central partition of the housing, said bosses engaging with opposite sides of the pair of flat strips in each of the chambers and holding the strips of each pair in contact with each other, contact prongs connected to the bus bars at the other end of the housing and extending beyond the housing, and a flat strip of insulating material secured to the central partition in the housing and closing the opening in the bottom of the housing, said strip of insulating material engaging with and holding the bus bars in the respective chambers in the housing.

2. An electrical wiring device of the character described as defined in claim 1 wherein the ends of the bus bar strips aligned with the respective openings in the end walls of the housing form opposing spring fingers for engagement with a contact prong inserted therebetween.

3. An electrical wiring device of the character described as defined in claim 1 wherein the housing has a pair of spaced contact-prong receiving openings formed in the top thereof, each of said contact-prong receiving openings communicating with one of the chambers in the housing and each pair of the flat strips forming the bus bars in the respective chambers has opposing spring portions shaped to receive a contact prong therebetween and the opposing spring portions of the respective pairs of strips are aligned with one of the openings in the top of the housing.

4. An electrical wiring device of the character described as defined in claim 1 wherein the flat strip of insulating material closing the bottom of the housing has spaced openings therein, each of said openings communicating with one of the chambers in the housing and the contact prongs connected to the respective bus bars in the chambers extend through said openings in the strip and at right angles to the housing.

5. An electrical wiring device of the character described as defined in claim 4 wherein the side walls of the housing are reduced in height opposite the contact prongs extending at right angles to the housing whereby said housing will fit over an electrical outlet with adjoining portions of the side walls resting on a supporting surface adjacent the outlet.

6. In an electrical wiring device of the character described which includes a hollow housing of insulating material having separate chambers formed therein, each of which contains a bus bar of electrically conductive material, the improvement which comprises a contact blade connected to each of the bus bars at one end of the housing, said contact blades extending beyond the housing in spaced relation to each other and at right angles to the housing, and means formed in the housing for positioning the contact blades, said means including walls defining two pairs of spaced recesses with each of said recesses shaped to receive the end of one of the contact blades therein, said pairs of recesses being spaced 90 degrees with respect to each other and one of said pairs being located on the center line of the housing.

References Cited in the file of this patent

UNITED STATES PATENTS

| | | |
|---|---|---|
| 460,725 | Markle | Oct. 6, 1891 |
| 1,275,693 | Hubbell | Aug. 13, 1918 |
| 1,351,191 | Sidon | Aug. 31, 1920 |
| 1,938,372 | Brudie | Dec. 5, 1933 |
| 2,240,180 | Frank | Apr. 29, 1941 |
| 2,269,779 | Morten | Jan. 13, 1942 |
| 2,284,837 | O'Brien | June 2, 1942 |
| 2,488,113 | Barocas | Nov. 15, 1949 |

FOREIGN PATENTS

| | | |
|---|---|---|
| 918,879 | France | Nov. 12, 1946 |